May 3, 1955 K. E. PEILER 2,707,354
FEEDER PLUNGER POSITIONING MECHANISM
Filed July 1, 1953
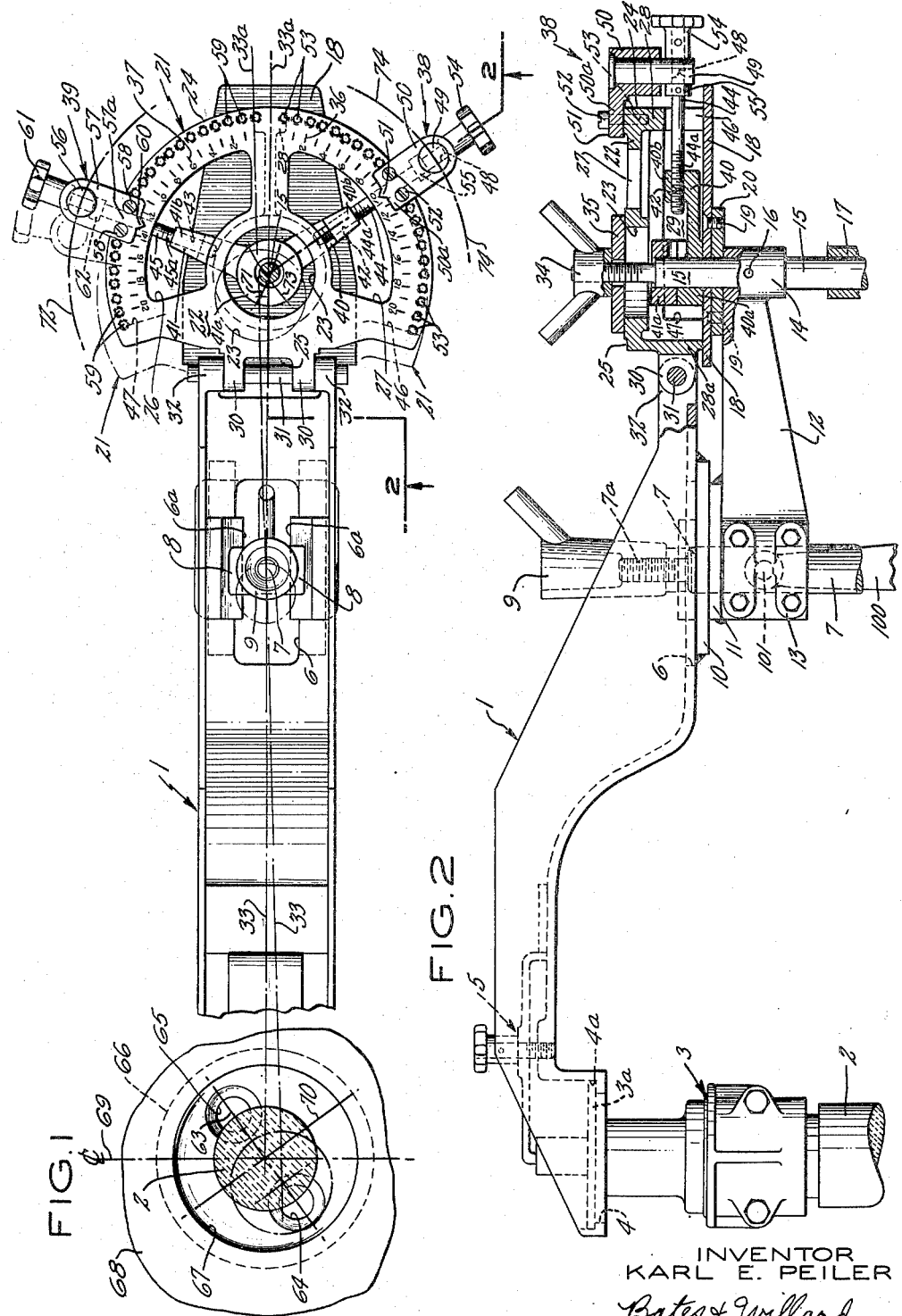
INVENTOR
KARL E. PEILER
BY Bates & Willard
ATTORNEYS United States Patent Office 2,707,354
Patented May 3, 1955

2,707,354

FEEDER PLUNGER POSITIONING MECHANISM

Karl E. Peiler, West Hartford, Conn., assignor to Emhart Manufacturing Company, Hartford, Conn., a corporation of Delaware Application July 1, 1953, Serial No. 365,405

7 Claims. (Cl. 49—55)

This invention relates to means for adjusting horizontally the position of the vertical path of reciprocation of a vertical implement or so called plunger that depends into the molten glass contained in the feed bowl of a glass feeder in working relation to a vertical glass flow passage or well in the bottom of the feed bowl.

More particularly, the invention is an improvement over the adjusting mechanism for this purpose that is included in a well known type of glass feeder, an example of which is disclosed in U. S. Patent No. 1,760,254.

In a feeder of the character described, molten glass is supplied to the glass feed bowl by a forehearth or furnace extension and is fed therefrom downwardly through the vertical discharge passage or well in the bottom of the feed bowl and thence through one or a pair of orifices in an orifice ring which is positioned at the bottom of the vertical discharge passage or well. Feeding of glass through this outlet passage or well and from the orifice or orifices in the bottom thereof is under the control of suitable refractory implements, including a vertical refractory implement or plunger which is reciprocated in the glass in the feed spout with its lower end in the outlet passage or well and close to the bottom thereof at the end of each of its down strokes.

When the orifice ring employed has a single orifice, such orifice ordinarily is located in a centered relation to the outlet passage or well and any lateral adjustment of the reciprocating vertical plunger then is primarily to obtain and maintain a centered relation of the plunger to the well and final discharge orifice. However, use of an orifice ring having two discharge orifices is now common. The orifices of such a ring generally are located equi-distant from and at diametrically opposite sides of the vertical center line of the vertical discharge passage or well. A horizontal line extending between the vertical center lines of the two orifices may intersect the vertical plane in which the feeder center line lies at any one of a considerable number of different angles and it may be desirable to adjust the plunger horizontally in either direction along the line connecting the center lines of the orifices or along a line parallel thereto or along a line perpendicular thereto.

The plunger positioning mechanism of the feeders of the type above referred to as provided prior to the present invention and as disclosed in my aforesaid Patent 1,760,254 comprises one manually operable adjusting element for adjusting the plunger horizontally along a line perpendicular to the feeder center line and a separate adjusting element operable to adjust the plunger horizontally along a slightly arcuate path which closely follows the feeder center line or a line parallel thereto. This prior plunger positioning mechanism is not suitable for the positioning adjustments required when, as sometimes is desirable, the orifices at the bottom of the feed bowl are located along a line which intersects the feeder center line at an angle other than a right angle.

An object of the present invention is to provide a positioning mechanism for the plunger of a feeder of the character described which is operable to adjust the plunger horizontally along a line connecting the vertical center lines of two orifices in the bottom of the feeder glass discharge bowl or along a line parallel therewith or along a line perpendicular thereto when the line connecting the vertical center lines of the two orifices intersects the plane of the feeder center line at any acute or other desired angle or lies in such plane.

A further object of the invention is to improve the plunger positioning mechanism of a feeder of the character described so that manipulation of but a single adjusting element will cause a horizontal adjusting movement of the feeder plunger in a direction having components of predetermined angular relationship to each other.

A further object of the invention is to provide a plunger positioning mechanism of the character described having a pair of angularly adjustable adjusting devices which can be preset in view of the angle which the line connecting the centers of the two orifices in the bottom of the feeder bowl makes with the feeder center line to move the plunger horizontally substantially along or parallel to that line when one of these adjusting devices is operated and to move the plunger along the line extending approximately at a right angle to the first line when the second of these adjusting devices is operated.

Other objects and advantages of the invention hereinafter will be pointed out or will be obvious from the following description of a practical embodiment of the invention as shown in the accompanying drawings, in which:

Fig. 1 is a somewhat schematic and fragmentary plan view of the plunger carrying arm of a feeder of the character described with the improved plunger positioning mechanism applied thereto, the view also showing the glass discharge passage or well in the bottom of a glass feeder bowl together with the feeder plunger, shown in section, disposed in operative relation thereto; and Fig. 2 is a side elevation of the plunger carrying arm and attached elements with the plunger positioning mechanism shown in section along the line 2—2 in Fig. 1.

In the drawings, the numeral 1 designates a plunger carrying arm such as is included in the glass feeder of the type previously mentioned herein. A refractory feeder implement or plunger 2 is suspended from one end of this arm so as to be rigid therewith although detachable therefrom. Any suitable known means may be employed to connect the plunger to the arm. As shown, a suitable chuck 3 firmly holds the plunger by its upper end and has a supporting flange 3a normally kept seated in a counterbore 4a above a clearance opening 4 in the end portion of arm 1 by clamping means 5. See Fig. 2.

The arm 1 is provided at a predetermined distance from its plunger-carrying end with a longitudinal medial slot 6. A vertical guide rod 7 extends upwardly through the slot 6 between parallel guiding surfaces 6a at the opposite edges of a portion of the slot. The width of the slot between the guide surfaces 6a—6a is only sufficiently greater than the diameter of the portion of the guide rod 7 extending therethrough to permit limited longitudinal movements of the arm relative to the guide rod or to swing about the guide rod as a pivot without permitting any lateral bodily movement of the arm relative to the rod. These movements are for adjustment of the position of the plunger and when the desired adjustment has been effected, the arm 1 is secured to the guide rod 7 so as to move only therewith until a further adjustment is desired, at which time the arm is freed from the guide rod sufficiently for the adjustment. In practice the guide rod 7 is mounted and guided by conventional means (not shown) for limited vertical reciprocating movements only at a predetermined location at one side of and adjacent to the feeder bowl.

The means to secure the arm 1 to the guide rod 7 includes a centrally apertured clamping plate 8 and a wing nut 9 on the upper end portion of the guide rod, the plate 8 being held down on the underlying portion of the arm 1 by the nut 9, the upper end portion of the guide rod being appropriately screw threaded as indicated at 7a, Fig. 2, for engagement with nut 9. The arm 1 has a suitably apertured bearing plate 10 surrounding the guide rod and fixed to the under side of the arm, as by welding, and this plate in turn rests on a bearing plate 11 which also is suitably apertured to encircle the guide rod and is fixed, as by welding, to the upper side of a portion of a bracket 12 which is secured by a clamping means 13 to the vertical guide rod 7. The bracket 12 is formed with a vertical collar portion 14 at its end remote from the guide rod 7 and is of sufficient length to extend beyond the adjacent end of arm 1 when arranged to underlie the end portion of the arm 1 that is remote from the plunger 2 as shown in Fig. 2. A vertical post 15 extends through the collar 14 to which it is rigidly secured, as by a pin 16. The post 15 extends at a suitable distance below the collar through a fixed bearing, indicated at 17, so that vertical reciprocatory movements of the bracket 12 and the parts carried thereby, including guide rod 7 and post 15 will not be attended by any lateral swinging movements of the bracket 12. The guide post 15 also projects a substantial distance above the collar 14. A horizontal bearing plate 18 is fastened by screws 19 to an attaching plate 20 which may be integral with the underlying end portion of the bracket 12 or fixed thereto by welding or in any other known manner. See Fig. 2. The projecting upper end portion of the post 15 extends through plates 18 and 20 that are suitably apertured for that purpose.

In practice, the vertical reciprocatory movements of arm 1 and plunger 2 carried thereby are caused by the operation of a suitable mechanism for that purpose, this including a link 100 pivotally attached at 101, Fig. 2, to the bracket and partially shown in that view.

The parts of the illustrative example shown in the drawings and/or particularly pointed out so far do not per se form part of the present invention and may be the same or substantially the same as corresponding parts of the feeder structure disclosed by Patent No. 1,760,254. The present invention does however provide a novel and importantly advantageous plunger position adjusting mechanism which will now be described.

The novel plunger position adjusting mechanism of the present invention comprises a horizontally movable hinge member generally designated 21 in the form of a horizontally disposed plate 22 provided with a circular opening 23 which is considerably larger diametrically than the upper portion of the post 15 which projects therethrough. The outer or marginal edge of the plate is arcuate as indicated at 24 for an angular extent of more than 180° around the center of opening 23 with which arcuate edge 24 is concentric. The plate 22 may be formed with the remaining minor portion, indicated at 25, of its marginal edge more nearly straight or chord-like than the arcuate major portion 24 thereof, although this is not essential. Also, for economy of material and lightness, the plate 22 may be formed or provided with symmetrically located relatively large apertures or cut-out openings 26 and 27, respectively, between the central opening 23 and outlying portions of the arcuate marginal edge 24.

The hinge member 21 has a downturned marginal flange 28 on the plate 22 resting on the bearing plate 18. A space 29, Fig. 2, thus is provided between the plate 22 and plate 18 for a purpose to be presently explained. A pair of horizontally spaced lugs or ears 30 project from a portion, designated 28a, of the downturned marginal flange midway between the ends of the arcuate marginal edge of the hinge member and are connected by a horizontal hinge pin 31 to co-operative spaced attaching ears 32 on the adjacent end of arm 1. The arrangement is such that the longitudinal median line of arm 1, indicated at 33 in Fig. 1, will, when extended as indicated at 33a, bisect plate 22 and extend diametrically across opening 23 to the midway point of the arcuately curved portion 24 of the marginal edge of such plate.

As shown in Fig. 1 in full lines, the hinge member 21 is disposed on bearing plate 18 so that both the wall of the central circular opening 23 therein and the arcuate portion 24 of the marginal edge of the plate are concentric with the upwardly projecting portion of the post 15 which thus extends through opening 23 centrally thereof. The hinge member 21 may be clamped to the bearing plate 18 in this or any other of its adjusted positions hereinafter described, so as to prevent accidental or unintended horizontal shifting of member 21 relative to post 15. As shown, a wing nut 34 in threaded engagement with the upper end portion of post 15 may be tightened against any underlying suitably apertured clamping plate or washer 35 which rests upon a portion of plate 22 over the opening 23. The pressure thus exerted on hinge member 21 will hold it in place on plate 18.

The plate 22 has series of regularly spaced graduations 36 thereon extending along and adjacent to the arcuately curved marginal edge 24 of the plate in a clockwise direction as viewed from the right hand end of Fig. 1 and beginning at the left of and adjacent to the extended longitudinal middle line 33a. A similar series of similarly spaced graduations 37 is provided on the plate 22 beginning at the right of the extended line 33a and extending counter-clockwise as viewed from the right hand end of Fig. 1. In the example shown, the graduations of each series represent numerals from 1 to 20, only the even numbers being marked. The scales thus provided indicate positions at which adjusting devices 38 and 39, respectively, Fig. 1, which are mounted pivotally on the post 15 in space 29 beneath plate 22 are to be attached to the outer or rim portion of hinge member 21 when the line connecting the centers of the two orifices in the bottom of the feeder bowl involved intersects the feeder center line at a given angle in order that the plunger carried by arm 1 and used to control feed of glass through these orifices shall be adjusted horizontally as desired by means of one or the other of these adjusting devices and as presently will be described.

Each of the adjusting devices 38 or 39 comprises a rigid arm 40 or 41 having its inner end portion formed as a hub 40a or 41a mounted on the portion of the post 15 that extends upwardly through space 29 in hinge member 21. The outer end portion of each arm 40 or 41 is provided with an integral lug 40b or 41b. A threaded opening 42 or 43 is provided in lug 40b or 41b, the axis of such opening being parallel with the longitudinal axis of arm 40 or 41. A rigid rod 44 has a threaded inner end portion 44a engaged with threaded opening 42. A similar rigid rod 45 has its inner end portion 45a threaded and engaged with opening 43. The flange 28 of hinge member 21 is undercut or slotted at 46 to clear rod 44 which projects therethrough to the exterior of the hinge member 21 at one side of the vertical plane in which lies extension 33a of the longitudinal median line 33 of arm 1. A similar slot or undercut 47 is provided in flange 28 at the opposite side of this vertical plane to accommodate the rod 45 which projects therethrough. The projecting portion of rod 44 extends through a transverse bore 48 in the depending lower end portion of a supporting headed vertical pivot post 49 swivelly carried by a bracket 50 having an attaching arm 50a resting upon plate 22 adjacent to and outward from the series of graduations 36 thereon. An index element 51 is provided on bracket arm 50a in position to cooperate with the graduations 36 so that the angular position of radial adjusting member 40—44 with respect to the longitudinal median line 33—33a of arm 1 and hinge member 21 may be predetermined and will be indicated when the bracket 50 has been attached to the plate 22 with the index element 51 in register with a selected graduation 36. Any suitable known means may be employed to secure the bracket 50 to plate 22 in an angularly predetermined position such, for example, as that shown in Fig. 1. In the example shown, the bracket 50 is fastened firmly to plate 22 by two screws 52 which pass downwardly through bracket arm 50a and threadedly engaged two adjacent holes 53 in plate 22. A series of such holes 53 may be provided initially in plate 22 or as needed for angular adjustment of the position of bracket 50 along the series of graduations 36.

To adjust the effective length of the radial composite adjusting member 40—44, the outer rod section 44 thereof may be turned about its own axis in the transverse bore 48 of supporting pivot post 49. A suitable knob or handle 54 is provided on the extremity of rod 44 at the opposite side of vertical pivot post 49 from a collar 55 to co-operate with the latter to prevent longitudinal movement of rod 44 relative to post 49 when rod 44 is turned about its axis.

The parts of adjusting device 39 as just described are duplicated in adjusting device 39 which includes the compound radial member 41—45. The outer rod section 45 of this member is rotatably supported by the transversely bored depending portion of a vertical pivot post 56 carried by a bracket 57 having an attaching arm 57a fastened to plate 22 by two screws 58 engaged with selected adjacent threaded holes 59 in plate 22 so that an index element 60 or bracket arm 57a registers with a predetermined graduation 37 on the plate. A knob or handle 61 is provided on the outer end of rod 45 and a collar 62 is provided thereon at the opposite side of pivot post 56 so that rod 45 will be retained against longitudinal movement relative to pivot post 56 when it is turned by the knob or handle 61 to adjust the effective length of radial member 41—45.

The pre-setting of the angular relations to the longitudinal median line 33—33a of arm 1 and hinge member 21 of the adjusting devices 38 and 39, respectively, when such devices have been fastened to hinge member plate 22 as described is determined in a given feeder installation according to the angle at which a horizontal line, indicated at 63, Fig. 1, extending between the vertical centers of twin orifices 64 and 65, respectively, of an orifice ring 66 at the bottom of a vertical discharge passage or well 67 in the bottom 68 of a feeder spout or bowl (not shown) intersects the feeder center line which is indicated at 69. The feeder center line is the longitudinal center line of the feeder forehearth and spout or bowl considered as a unit. The longitudinal center line 33—33a of plunger carry arm 1 and plunger position adjusting hinge member 21 normally is perpendicular to the feeder center line when the angular adjustment of arm 1 around the axis of vertical guide post 7 is such that plunger 2 is centered in well 67. The full line positions of hinge member 21, arm 1 and the feeder plunger in Fig. 1 are such as to accomplish this result. In that view, the line 63 from the center of the orifice 64—the one nearer to the front of the feeder—to the center of the more rearwardly located orifice, 65, intersects the feeder center line at an angle of about 45 degrees. The feeder plunger, as shown in full lines in Fig. 1, is centered at the intersection midway between the centers of the two orifices of the line 63 with a horizontal line indicated at 70 which is perpendicular to line 63. In the operation of the feeder it may be necessary or desirable to adjust the plunger horizontally in either of opposite directions along the line 63 from the centered position shown in full lines, as to the position toward orifice 64 as shown by the dot-and-dash line circle in Fig. 1, or in either of opposite directions along line 70 or possibly along a line parallel with line 63 after the plunger has been moved to a predetermined extent in one direction or the other along line 70. These adjustments may be required because of differences of temperature and viscosity between different portions or currents of molten glass passing to the individual orifices at the bottom of the well 67, or other service condition, and are useful in effecting desirable control of the shape and weight of charges severed simultaneously from glass issuing from the two orifices so that such simultaneously produced charges will be approximately alike.

The places at which the adjusting devices 38 and 39 are fastened to the rim portion of shiftable hinge member 21 at opposite sides of the longitudinal median line 33—33a of the plunger carrying arm and hinge member have been determined as proper for these adjustments of the plungers. For any such adjustment it is of course necessary first to loosen the wing nuts 9 and 34. If the adjustment is to be along line 63 in the direction of orifice 64, as to the position shown by the dot-and-dash line circle in Fig. 1, the knob or handle 54 of adjusting device 38 is turned to shorten the radial compound adjusting member 40—44 while the length of radial compound adjusting member 41—45 of adjusting device 39 remains unchanged. Because of the co-operative effects of the structural elements involved, the hinge member 21 will be given a movement having both a forward component, i. e., in the direction of length of arm 1 toward the well 67, and a lateral component to the right as viewed from the right hand end of Fig. 1. The hinge member 21 will be shifted from the full line position to the dot-and-dash line position of Fig. 1, the center of the opening 23 in its central portion moving along the flat arc 71 while the center of pivot post 56, about which there is a shifting movement of the hinge member, is moved with the hinge member along arc 72. In consequence the arm 1 will be shifted forward and also swung counter-clockwise slightly about the axis of post 7 as shown by the shifting of longitudinal median line 33—33a in Fig. 1.

To shift the plunger 2 from its centered position in the opposite direction along line 63 or toward orifice 65, it is only necessary to turn the knob or handle 54 of adjusting device 38 to increase the effective length of radial adjusting member 40—44.

To adjust the plunger 2 from its centered position in one direction or the other along line 70, the knob or handle 61 of adjusting device 39 is turned to decrease or increase the effective length of the radial adjusting member 41—45 as required while the length of the radial adjusting member 40—44 of adjusting device 38 is unchanged. On this adjustment the center of opening 23 in hinge member 21 will be shifted along flat arc 73 while the center of pivot post 49 will be shifted along arc 74.

Tightening of wing nuts 9 and 34 will retain the adjusted parts in adjusted positions.

It may be noted that the double orifice ring of a feeder of the character described will be applied to the feeder bowl so that the orifices are properly located for shearing of glass descending therefrom by the feeder shears (not shown) which for a particular feeder installation, may be mounted on the feeder bowl at the front of the feeder, i. e., at the feeder center line or at a position moved angularly around the bowl in either direction from the front to a predetermined extent. Factory space limitations, location of an adjacent co-operative machine or other considerations may determine the angular relation of the feeder shears to the feeder center line in a particular feeder and this in turn will determine the angular relation of the line connecting the centers of the twin orifices of the feeder orifice ring. The adjusting devices 38 and 39 of the novel plunger positioning mechanism of the present invention will be pre-set in positions angularly related to the longitudinal median line of the plunger carrying arm predetermined in view of the angular relation of the line between the orifices to the feeder center line and hence in view of the angular relation of the feeder shears to the same line. These positions may be predetermined and charted for different angular locations of feeder shears.

Various changes in and modifications of the illustrative embodiment of the invention shown by the accompanying drawings and herein particularly described will now be obvious to those skilled in the art and I therefore do not wish to be limited to the details of such embodiment.

I claim:

1. In a glass feeder, the combination with a substantially horizontal supporting arm, a rigid implement supported by one end of said arm to depend vertically therefrom, and means supporting said arm at a place between said one end of the arm and its opposite end so that said implement is positioned above and with its lower end adjacent to a glass discharge orifice ring of the feeder and so that said arm may be swung horizontally in either of opposite directions about a vertical axis located at the place of support of the arm and also shifted longitudinally in either direction relative to said vertical axis, of an adjusting mechanism comprising a vertical post located beyond said opposite end of said supporting arm and adjacent thereto, a pair of angularly related substantially horizontal elongate adjustable-length rigid adjusting devices pivotally mounted at their inner ends on said post, and a rigid plate having a motion transmitting connection with said opposite end of the supporting arm and to which the outer ends of said adjusting devices are operatively connected at points spaced angularly about the axis of said vertical post.

2. In a glass feeder, a substantially horizontal arm adapted at one end to carry a rigid vertical implement pendant therefrom, means supporting said arm at a place between its said end and the opposite end thereof so that the implement is positioned above an orifice ring of the feeder and so that said arm may be swung angularly in its plane about a vertical axis and shifted longitudinally relative to said vertical axis to shift the implement horizontally above the orifice ring, a vertical post located beyond the opposite end of said arm and adjacent thereto, a substantially horizontal plate having a motion-transmitting connection at one edge thereof with the opposite end of said arm, said plate having a generally central opening formed therein, means supporting said plate so that said post extends upwardly through said opening in the plate and said plate may be shifted horizontally in any direction to a limited extent to adjust said arm and the position of said implement relative to the orifice ring, the opening being considerably larger than the portion of the post extending therethrough to permit the plate to be shifted as aforesaid, and a pair of elongate adjustable-length rigid plate shifting members pivotally mounted at their inner ends on said post and connected at their outer ends by vertical pivot elements with said plate at points spaced angularly about the center of said opening in the plate, whereby adjustment of length of either of said elongate members to shift the plate relative to the post will be attended by a shifting of the plate about the axis of the pivot element of the connection of the outer end of the other elongate member with said plate.

3. In a glass feeder, a substantially horizontal arm adapted at one end to carry a rigid vertical implement pendant therefrom, means supporting said arm at a place between its said end and the opposite end thereof so that the implement is positioned above an orifice ring of the feeder and so that said arm may be swung angularly in its plane about a vertical axis and shifted longitudinally relative to said vertical axis to shift the implement horizontally above the orifice ring, a vertical post located beyond the opposite end of said arm and adjacent thereto, a substantially horizontal plate having a motion-transmitting connection at one edge thereof with the opposite end of said arm, said plate having a generally central opening formed therein, means supporting said plate so that said post extends upwardly through said opening in the plate and said plate may be shifted horizontally in any direction to a limited extent to adjust said arm and the position of said implement relative to the orifice ring, the opening being considerably larger than the portion of the post extending therethrough to permit the plate to be shifted as aforesaid, and a pair of adjusting devices each comprising a rigid arm pivotally mounted at its inner end on said post, a rod threadedly engaged at its inner end with the outer end of said arm, a bracket detachably fixed to an edge of said plate, a vertical pivot post journalled in said bracket, said vertical pivot post having a transverse bore in which the outer end of said rod is journalled, and means to prevent longitudinal movement of said rod relative to said vertical pivot post when said rod is turned about its longitudinal axis independently of the rigid arm.

4. In a glass feeder, a substantially horizontal rigid arm adapted at one end to carry a pendant rigid implement, means supporting said arm at a place intermediate its length so that said arm may be swung about a vertical axis located at its place of support or shifted longitudinally relative to said vertical axis, a substantially horizontal plate bodily movable in its plane and connected at one edge with the second end of said rigid arm to shift the latter when said plate is moved, said plate having a circular opening provided therein with the center of the opening lying in the vertical plane of the longitudinal median line of said rigid arm and having also a marginal edge of arcuate configuration with its middle point located at the opposite side of said opening from the edge of the plate that is connected with said rigid arm and in the vertical plane of said longitudinal median line of the rigid arm, a vertical post extending through said opening with sufficient clearance to permit said bodily movement of the plate relative to said post, and a pair of horizontal plural-section adjustable-length rigid plate adjusting members having inner end portions pivotally mounted on said vertical post and outer end portions pivotally mounted on the arcuate marginal edge portion of the plate at predetermined positions thereon spaced clockwise and counter-clockwise, respectively, from the middle point of said arcuate edge portion.

5. In a glass feeder, a substantially horizontal rigid arm adapted at one end to carry a pendant rigid implement, means supporting said arm at a place intermediate its length so that said arm may be swung about a vertical axis located at its place of support or shifted longitudinally relative to said vertical axis, a substantially horizontal plate bodily movable in its plane and connected at one edge with the second end of said rigid arm to shift the latter when said plate is moved, said plate having a circular opening provided therein with the center of the opening lying in the vertical plane of the longitudinal median line of said rigid arm and having also a marginal edge of arcuate configuration with its middle point located at the opposite side of said opening from the edge of the plate that is connected with said rigid arm and in the vertical plane of said longitudinal median line of the rigid arm, a vertical post extending through said opening with sufficient clearance to permit said bodily movement of the plate relative to said post, a pair of horizontal plural-section adjustable-length rigid plate adjusting members having inner end portions pivotally mounted on said vertical post and outer end portions pivotally mounted on the arcuate marginal edge portion of the plate at predetermined positions thereon spaced clockwise and counter-clockwise, respectively, from the middle point of said arcuate edge portion, and individual handle means operatively connected to the respective rigid plate adjusting members for adjusting the effective length of these rigid members selectively to effect predetermined adjustments of said plate relative to said vertical post.

6. In a glass feeder, a substantially horizontal rigid arm adapted at one end to carry a pendant rigid implement, means supporting said arm at a place intermediate its length so that said arm may be swung about a vertical axis located at its place of support or shifted longitudinally relative to said vertical axis, a substantially horizontal plate bodily movable in its plane and connected at one edge with the second end of said rigid arm to shift the latter when said plate is moved, said plate having a circular opening provided therein with the center of the opening lying in the vertical plane of the longitudinal median line of said rigid arm and having also a marginal edge of arcuate configuration with its middle point located at the opposite side of said opening from the edge of the plate that is connected with said rigid arm and in the vertical plane of said longitudinal median line of the rigid arm, a vertical post extending through said opening with sufficient clearance to permit said bodily movement of the plate relative to said post, and a pair of horizontal plural-section adjustable-length rigid plate adjusting members having inner end portions pivotally mounted on said vertical post and outer end portions pivotally mounted on the arcuate marginal edge portion of the plate at predetermined positions thereon spaced clockwise and counter-clockwise, respectively, from the middle point of said arcuate edge portion, said plate having similar scales thereon extending clockwise and counterclockwise respectively from the middle point of the arcuate marginal edge thereof to indicate in terms of angular relationship with the vertical plane of the longitudinal median line of the horizontal rigid arm series of selective positions at which the outer ends of the adjustable-length rigid plate-adjusting members may be mounted on the arcuate marginal edge portion of the plate.

7. The combination specified by claim 6 wherein individual brackets for the respective adjustable-length rigid plate-adjusting members are movable bodily around the arcuate marginal edge of the plate respectively at opposite sides of said middle point thereof and are fixable to the plate at the selective positions indicated by said scales, and individual vertical pivot posts are carried by the respective brackets and are operatively connected with the outer ends of the respective rigid plate-adjusting members.

References Cited in the file of this patent
UNITED STATES PATENTS

| | | |
|---|---|---|
| 1,760,254 | Peiler | May 27, 1930 |
| 1,816,275 | Algeo et al. | July 28, 1931 |